United States Patent [19]

Moertel et al.

[11] 3,735,469

[45] May 29, 1973

[54] APPARATUS FOR FORMING SLIDE FASTENERS

[75] Inventors: George B. Moertel, Conneautville; James R. Wilson, Conneaut Lake, both of Pa.

[73] Assignee: Textron Inc., Providence, R.I.

[22] Filed: Jan. 24, 1972

[21] Appl. No.: 220,296

Related U.S. Application Data

[62] Division of Ser. No. 34,340, May 4, 1970, Pat. No. 3,672,008.

[52] U.S. Cl. ..........29/207.5 R, 29/207.5 ST, 29/408
[51] Int. Cl. ........................B23p 19/04, B23p 11/00
[58] Field of Search ......................29/207.5 ST, 408, 29/207.5 R, 410, 400 R, 200 B

[56] References Cited

UNITED STATES PATENTS

| | | | |
|---|---|---|---|
| 2,900,694 | 8/1959 | Brown | 29/410 X |
| 3,353,256 | 11/1967 | Frohlich et al. | 29/408 |

Primary Examiner—Thomas H. Eager
Attorney—Alexander R. Field

[57] ABSTRACT

Apparatus for forming a slide fastener having terminal elements reduced in size relative to the remaining fastener elements and two stop members adjacent the terminal fastener elements each being formed from a mass of fusible material fused onto the slide fastener including a support block having parallel channels for receiving separate slide fastener tapes, a forming anvil having a pair of spaced legs movable in the channels to capture the terminal fastener elements in cavities therein, a source for supplying ultrasonic energy to the forming anvil to reduce the size of the terminal fastener elements, a forming block supporting the separated slide fastener tapes adjacent cavities defined therein by another forming anvil, a forming member engaging the forming block to move the forming block relative to the other forming anvil and shear blanks of fusible material in the cavities, and a source for supplying ultrasonic energy to the forming member to fuse the blanks onto the slide fastener tapes to form separate stop members.

32 Claims, 9 Drawing Figures

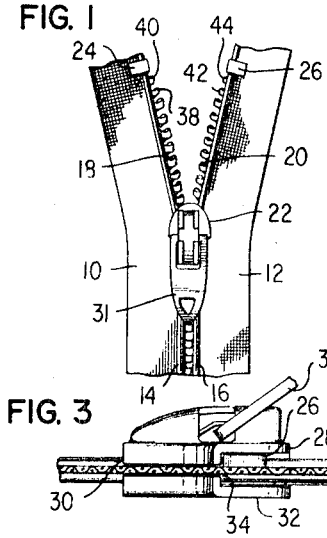
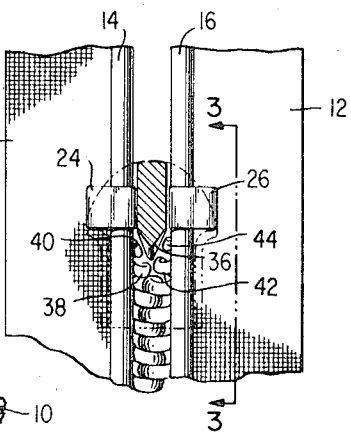
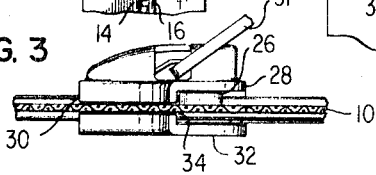
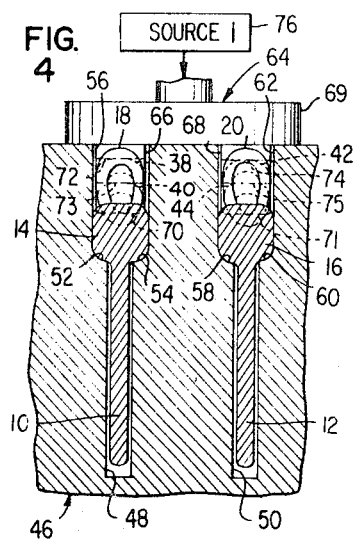
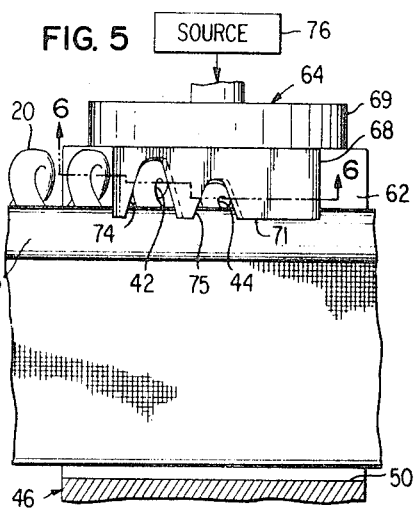

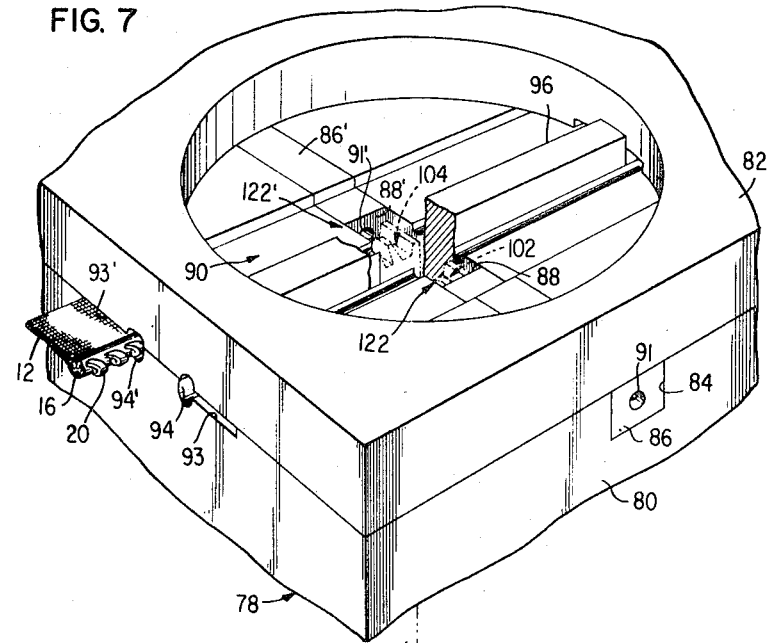
FIG. 7
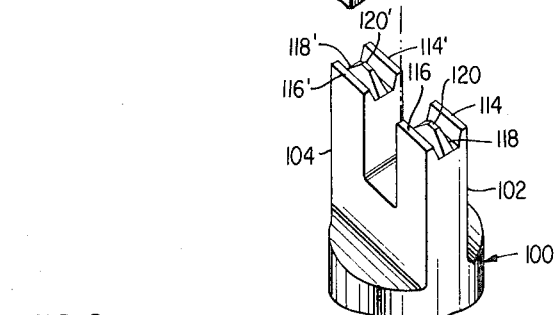
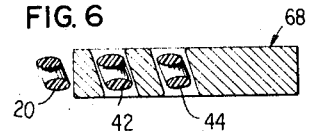
FIG. 6

APPARATUS FOR FORMING SLIDE FASTENERS

CROSS REFERENCE TO RELATED APPLICATION

This is a divisional application of copending application Ser. No. 34,340 filed May 4, 1970, now U.S. Pat. No. 3,672,008 granted June 27, 1972.

BACKGROUND OF THE INVENTION

1. Field of the Invention

The present invention pertains to the forming of slide fasteners and more particularly to the forming of a top portion of slide fasteners having fastener elements formed from a continuous filament of deformable material.

2. Description of the Prior Art

It is customary to provide end stops for slide fasteners; that is, a bottom stop for limiting opening movement of a slider and a top stop for limiting closing movement of the slider. The bottom stop for many applications is not externally visible after installation in a garment and is normally installed in a garment where the material is joined such that the bottom stop may have a variety of shapes without irritating the wearer of the garment, without adversely affecting its functional requirements and without hampering installation in a garment. Top stops, however, are relatively prominent and visible after installation in garments and must be precisely positioned with respect to the slide fastener to permit separation thereof.

In the past, a particular problem has been encountered in the top portion adjacent the top stop in that when the slider is positioned to engage the top stop the diamond of the slider is disposed between terminal fastener elements such that the upper ends of the slide fastener tape extending above the top stop are splayed. This splay is highly undesirable from an aesthetic standpoint and causes difficulties in installation of the slide fastener in a garment. These difficulties are accentuated as progress is made in the development of new techniques for quickly and automatically securing slide fasteners to materials, such as, the electrostatic methods now being incorporated into mass production lines.

Top stops for slide fasteners are conventionally made of bands of metal or other material, which bands are folded upon themselves and around cords on either side of the slide fastener tapes to which the fastener elements are attached. Such top stops have the disadvantages of being relatively difficult and expensive to form on the slide fasteners, and furthermore are unattractive as viewed from the exterior side of the slide fastener and are irritating to the wearer of the garment on the interior side of the slide fastener.

With the advent of slide fasteners utilizing fastener elements of filamentary plastic material, attempts have been made to provide top stops of similar plastic materials to reduce assembly and material costs as well as to permit dying of the top stops for aesthetic purposes. Such attempts have not met with success in that they have normally required the positioning of a bar of plastic material across the terminal fastener elements, which bar of material is fused with the tape and the fastener elements and then cut to provide two separate stop members. Prior art methods and apparatus for fusing such material along with the severing step have caused the final product to have considerable flash and jagged edges which require polishing or manual finishing prior to installation in a garment.

In order to permit installation of slide fasteners in a garment, it is normally required that the tape area above the top stop be flexible to permit folding of the tape during installation. It is accordingly, extremely desirable to have the upper edge of the top stop well defined; however, prior art top stops made of plastic material have not provided such definition.

SUMMARY OF THE INVENTION

Accordingly, it is an object of the present invention to construct a slide fastener that has a well defined top stop, is easily and simply manufactured and does not cause the upper ends of the slide fastener tape to splay.

In one embodiment, the present invention is summarized in apparatus for deforming terminal fastener elements of a slide fastener including support means for the slide fastener having channel means supporting the slide fastener to expose the terminal fastener elements, forming means having cavity means therein, the cavity means being smaller than the terminal elements means, and the forming means being movable within the channel means to capture the terminal fastener elements in the cavity means, and means for supplying energy to the forming means to cause the terminal fastener elements to assume the shape of the cavity means whereby the terminal fastener elements are reduced in size relative to the remainder of the fastener elements of the slide fastener.

Another object of the present invention is to form a top stop for a slide fastener by fusing separate masses of material thereto.

A further object of the present invention is to reduce the size of the terminal fastener elements of a slide fastener such that the upper tape ends of the slide fastener are not splayed when the slide fastener is closed.

A still further object of the present invention is to construct apparatus for forming separate top stop members for a slide fastener by separately fusing each stop member adjacent terminal fastener elements.

The present invention has another object in the construction of apparatus for deforming terminal fastener elements of a slide fastener to accommodate the diamond of a slider.

A further object of the present invention is to utilize ultrasonic energy to fuse top stop members onto a slide fastener tape and to deform terminal fastener elements of the slide fastener to reduce their size.

Some of the advantages of the present invention over the prior art are that the top portions of the slide fasteners are inexpensively and quickly formed by methods susceptible to mass production, that damage to the slide fastener tape during forming of the top stop is obviated, that no finishing or manual work is required for the top stop, that the surfaces of the top stop are smooth without jagged edges, and that the upper ends of the slide fastener tapes are not splayed when the slide fastener is closed.

Further objects and advantages of the present invention will become apparent from the following description of the preferred embodiment taken in conjunction with the accompanying drawings.

BRIEF DESCRIPTION OF THE DRAWINGS

FIG. 1 is a front elevation of a slide fastener having a top portion formed in accordance with the present invention.

FIG. 2 is an enlarged broken front elevation of the slide fastener of FIG. 1.

FIG. 3 is a section taken along line 3—3 of FIG. 2.

FIG. 4 is a front elevation, partially in section, of apparatus for deforming the terminal fastener elements of a slide fastener.

FIG. 5 is a side elevation, partially in section, of the apparatus of FIG. 4.

FIG. 6 is a section taken along line 6—6 of FIG. 5.

FIG. 7 is an exploded view in broken perspective of apparatus for forming a top stop in accordance with the present invention.

DESCRIPTION OF THE PREFERRED EMBODIMENT

Figure 8:
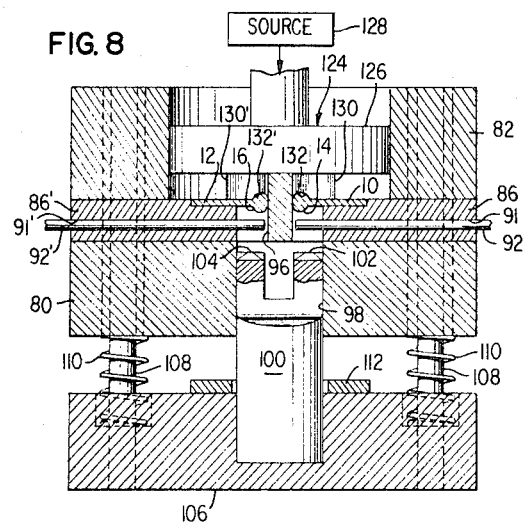
FIG. 8 is a side elevation partially in section of the apparatus of FIG. 7 during an initial forming step.

A slide fastener formed in accordance with the present invention is illustrated in FIG. 1 and includes a pair of woven tapes 10 and 12 having thickened cord portions 14 and 16, respectively, running longitudinally along the inner edges thereof. A plurality of fastener elements 18 and a plurality of fastener elements 20 are secured to cords 14 and 16, respectively, and are made of a continuous filament of deformable, plastic material such as nylon. The filamentary fastener elements illustrated have a coiled configuration, and the edges of the coils of fastener elements 18 and 20 face each other and are adapted to be interengaged by means of a slider 22. The present invention is not limited in application to the specific configuration of the filamentary fastener elements illustrated but rather may be utilized with filamentary fastener elements having a ladder-like configuration or other fastener elements made of a material which can be easily deformed or reduced in size.

A top stop for the slide fastener includes a pair of stop members 24 and 26 which are substantially identical in construction and are formed on opposite sides of the slide fastener. Each of stop members 24 and 26 is formed of a mass of precisely defined fusible material having dimensions commensurate with the dimensions of slider 22 to prevent movement of the slider beyond the stop members. Stop members 24 and 26 are illustrated as being disposed on the same side of the slide fastener as the pull of the slide, that is, the exterior side of the slide fastener; however, the stop members may be formed on the interior side of the slide fastener with equally acceptable results.

Slider 22 has an upper wing portion 28 having transverse downwardly extending marginal flanges 30 on either side thereof, and a pull 31 engages the slider at the upper wing portion, as is conventional. A lower wing portion 32 has transverse upwardly extending marginal flanges 34 on either side thereof aligned with flanges 30. The marginal flanges 30 and 34 are disposed at the rear of the slider and are vertically spaced to permit tapes 10 and 12 to move freely therethrough. An upright post forming a diamond 36 is disposed at the front of the slider and interconnects the upper and lower wing portions 28 and 32. The diamond 36 of the slider has a V-configuration with the point thereof disposed in a longitudinal center of the slider to define first and second channels around the diamond at the front of the slider, which channels merge at the rear of the slider such that interengagement of the fastener elements may be controlled by movement of the slider.

Stop members 24 and 26 act to limit closing movement of slider 22 by having a width in a direction transverse to the longitudinal axis of the slide fastener greater than the distance between the longitudinal center of the slider and the slightly curved front ends of flanges 30 and 34. Thus, the width of the stop members 24 and 26 is sufficient to prevent the stop members from moving through the slider; and, accordingly, when the inner edges of the stop members are adjacent the diamond, the outer edges of the stop members abut the front edges of flanges 30 and 34 to limit movement of the slider. Furthermore, the thickness of stop members 24 and 26 is greater than the space between flanges 30 and 34 such that the stop members cannot move through the slider as do tapes 10 and 12.

The terminal or end elements of fastener elements 18 and 20 are reduced in size to accommodate diamond 36 of slider 22, as best illustrated in FIG. 2. More specifically, terminal elements 38 and 40 of fastener elements 18 and terminal elements 42 and 44 of fastener elements 20 do not extend from cords 14 and 16, respectively, into the gap therebetween to the extent that the remaining fastener elements in the central portion of the slide fastener extend into the gap. Terminal element 38 is larger than terminal element 40, and similarly terminal element 42 is larger than terminal element 44 such that straight lines abutting the peripheries of terminal elements 38 and 40 and terminal elements 42 and 44 have a V-configuration corresponding to the V-configuration of the rear tapered edge of diamond 36. Thus, as illustrated in FIG. 2, when slider 22 is at its uppermost position engaging stop members 24 and 26, the reduced size of the terminal elements permits tapes 10 and 12 to extend beyond the upper edge of the slider without splay.

Apparatus for reducing the size of the terminal fastener elements is illustrated in FIGS. 4, 5 and 6 and includes a support block 46 having longitudinal channels 48 and 50 therein arranged in parallel spaced relation. Channel 48 is a narrow slot terminating in rounded shoulders 52 and 54 of a wide mouth 56 which communicates with an upper edge of support block 46. Similarly, channel 50 is a narrow slot terminating in rounded shoulders 58 and 60 of a wide mouth 62 communicating with the top surface of support block 46.

Separate halves of the slide fastener are vertically supported in channels 48 and 50 such that tapes 10 and 12 extend into the narrow slots and cords 14 and 16 rest on the rounded shoulders in mouths 56 and 62, respectively, to project the fastener elements towards the top of support block 46 and expose the terminal elements.

A forming anvil 64 in the form of an ultrasonic horn has legs 66 and 68 depending in spaced parallel relation from a support member 69, and legs 66 and 68 have a width less than the width of mouths 56 and 62 so as to be movable therein. Legs 66 and 68 have flat bottom surfaces 70 and 71 with parallel side walls extending transversely therefrom, respectively; and, pairs of generally V-shaped cavities 72, 73 and 74, 75 are disposed in bottom surfaces 70 and 71, respectively, at an angle to the side walls. The angular orientation of the cavities corresponds to the helical angle of the coiled fastener elements 18 and 20, as best illustrated in FIG. 6. Cavities 72 and 74 are larger than cavities 73 and 75 and are utilized to form terminal elements 38 and 42 while cavities 73 and 75 are utilized to form terminal elements 40 and 44. Forming anvil 64 is connected with a source of ultrasonic energy 76; and, as will be explained in more detail hereinafter, anvil 64 is pressed against cords 14 and 16 and the terminal fastener elements are captured in the cavities while ultrasonic energy is applied thereto to fuse the material of the terminal elements to cause them to assume the shape of the cavities and be reduced in size.

Figure 9:
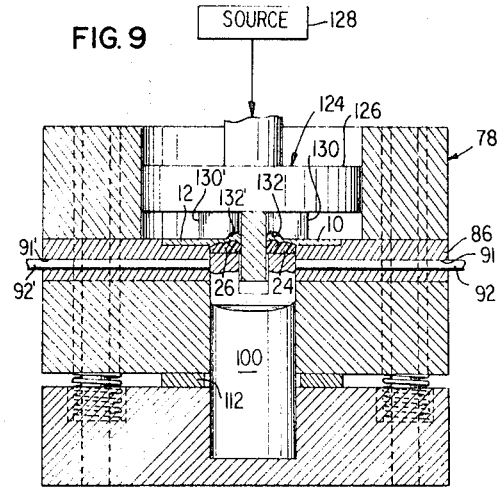
FIG. 9 is a side elevation partially in section of apparatus of FIG. 7 during a final forming step.

Apparatus for forming the top stop is illustrated in FIGS. 7, 8 and 9 and includes a forming block 78 having a base 80 and a top plate 82 secured thereto. Base 80 has a square channel 84 cut therethrough, and a pair of stock guides 86 and 86' are disposed therein. Guides 86 and 86' have flat inner surfaces 88 and 88' spaced from each other in a forming area 90, and longitudinal bores 91 and 91' extend through guides 86 and 86' to provide channels for supplying strips of stock 92 and 92' of a fusible material, such as a thermoplastic material like nylon, to forming area 90. Slide fastener guide channels 93 and 93' extend through forming area 90 transversely to bores 91 and 91', and channels 93 and 93' are formed with enlarged recesses 94 and 94' for receiving cords 14 and 16 of tapes 10 and 12, respectively. A central wall 96 extends through forming area 90 in a direction parallel to guide channels 93 and 93', and the cross sectional configuration of guide channels 93 and 93' are essentially the same as channels 48 and 50 of support block 46 to support slide fastener tapes 10 and 12 such that fastener elements 18 and 20 extend towards wall 96.

A central bore 98 is disposed in base 80 below forming area 90, and a bifurcated forming anvil 100 is movably disposed in bore 98 and has upwardly extending legs 102 and 104. The space between legs 102 and 104 corresponds to the width of wall 96 such that the legs 102 and 104 extend on either side of the wall. Forming anvil 100 has a cylindrical base which is secured in a support 106, and locating pins 108 are utilized to index the location of forming block 78 with respect to support 106. Bias springs 110 are coiled around each pin 108 and are mounted in compression between support 106 and forming block 78 such that in the absence of external forces, forming block 78 is spaced from an annular stop 112 disposed on the top of support 106 surrounding anvil 100.

Legs 102 and 104 of anvil 100 are identical; and, accordingly, only the structure of the forming end of leg 102 will be described with the identical structure of the forming end of leg 104 being given identical reference numbers with primes. The forming end of leg 102 has outer upstanding walls 114 and 116 of each of which has an inner surface tapering upwardly and outwardly. An energy directing projection 118 is located centrally between walls 114 and 116 and has four tapered side surfaces terminating in a small flat apex 120.

Legs 102 and 104 extend upwardly into the forming area 90, and the width of channel 84 corresponds to the width of legs 102 and 104 while the transverse dimensions of legs 102 and 104 correspond to the distance between surfaces 88 and 88' and central wall 96. Thus, it may be seen that legs 102 and 104 snugly slide between surfaces 88 and 88' and wall 96 to form cavities generally indicated at 122 and 122'.

A fusing member 124, in the form of an ultrasonic horn, has an annular support member 126 and is connected with a source of ultrasonic energy 128. A pair of legs 130 and 130' depend from support member 126 and have curved recesses 132 and 132' on the lower inner corners thereof. Legs 130 and 130' are spaced from each other to accommodate wall 96 and have vertical dimensions so as to engage slide fastener tapes 10 and 12 in block 78 when support member 126 contacts the upper surface of central wall 96.

A method of forming a slide fastener in accordance with the present invention will now be described utilizing the apparatus illustrated in FIGS. 4 through 9. The slide fasteners are mass produced in continuous chains with the fastener elements made of a continuous coiled filament of deformable material, such as nylon, as previously described; and, the fastener elements are attached to cords 14 and 16 in any conventional manner. The continuous slide fastener chains are gapped at predetermined locations to provide slide fasteners of desired lengths; that is, some of the fastener elements are cut or punched from the tapes to provide cleaned and gapped areas at which the slide fasteners are adapted to be cut.

The above described steps in the mass production of slide fasteners are provided as a brief background leading to the present invention which is concerned with the forming of the top portion for such slide fasteners. Thus, it is clear that the present invention may be utilized with slide fasteners of any configuration produced in any manner and not merely with the specific slide fastener illustrated in the drawings.

The gapped continuous slide fastener chain is separated, and the separate halves of the chain are supplied to support block 46 such that tapes 10 and 12 are inserted in channels 48 and 50 to expose the terminal ones of fastener elements 18 and 20, respectively. With the exposed terminal elements properly positioned in channels 48 and 50 forming anvil 64 is lowered such that legs 66 and 68 move within mouths 56 and 62 until bottom surfaces 70 and 71 engage cords 14 and 16 to capture terminal elements 38, 40, 42 and 44 in cavities 72, 73, 74 and 75, respectively. Once the terminal elements are captured in the cavities, ultrasonic energy from source 76 is supplied to forming anvil 64 to fuse or melt the terminal elements to cause them to assume the shape of the cavities; and, accordingly, the terminal elements are reduced in size relative to the remaining fastener elements.

After the terminal elements are deformed the chain is supplied to forming block 78 for forming of the stop members 24 and 26 thereon. The chain enters block 78 from the left hand side in guide channels 93 and 93' after tapes 10 and 12 have been rotated to substantially horizontal positions from the substantially vertical positions in support block 46. Cords 14 and 16 are received and supported in receses 94 and 94', respectively, as the chain is slidably moved within forming block 78 to a position where terminal elements 40 and 44 are adjacent the left hand edges of cavities 122 and 122', respectively. Once the tapes are so positioned, predetermined amounts of strips of stock 92 and 92' are exposed beyond surfaces 88 and 88' and above the forming ends of anvil 100 which is in its withdrawn position, and fusing member 124 is lowered such that support member 126 engages and moves forming block 78 relative to anvil 100 to abut stop 112 against the force from springs 110 to shear the strips of stock and dispose blanks of the fusible material in cavities 122 and 122' defined by the forming ends of anvil 100 in its extended position and surfaces 88 and 88'. Legs 130 and 130' engage slide fastener tapes 10 and 12 with recesses 132 and 132' accommodating cords 14 and 16, respectively, to precisely position the slide fastener and assure the forming of well defined stop members. Ultrasonic energy is supplied to fusing member 124, and the blanks can be fused to tapes 10 and 12, as to cords 14 and 16, or to both. The tapered side surfaces of upstanding walls 114, 114', 116 and 116' along with projections 118 and 118' localize the ultrasonic energy to precisely define the shape of stop members 24 and 26.

The fusing or melting of the blanks permits the fusible material to flow through interstices in the material of tapes 10 and 12 to provide a firm bond therebetween. The bond between the stop members and the tapes may be enhanced by utilizing threads made of a fusible material such as nylon to stitch or weave the fastener elements onto the tapes such that the blanks fuse with the threads.

Once the stop members have been formed, the chain is moved to the next gapped area adjacent reduced terminal elements to permit the forming of stop members for another slide fastener.

It will be appreciated that the stop members 24 and 26 are formed separately on the tape halves with well defined shapes to assure proper limiting of slider movement. No severing operations are required, and there are no projections or jagged edges thereby permitting the stop members to be formed on the interior of the slide fastener without irritating the wearer of a garment utilizing the slide fastener. The use of cavities for forming the stop members coupled with localization of the ultrasonic energy by the energy directing projections on the forming ends of anvil 100 permits the stop members to have precisely defined shapes with no flash and prevents undesired melting or fusing of other components of the slide fastener. The well defined shapes of the stop members also enhance flexibility of the gapped upper tape edges to facilitate installation in a garment.

Of course, it will be appreciated that conventional indexing means will be utilized in automating the above described methods and apparatus for mass production.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A method of forming a top portion for a slide fastener of the type having a tape carrying fastener elements made of a continuous filament of deformable material, said method comprising the steps of
supporting the slide fastener in a position such that terminal ones of the fastener elements are exposed;
deforming the terminal ones of the fastener elements; and
fusing a mass of fusible material to the tape adjacent the terminal ones of the fastener elements to form a top stop for the slide fastener.

2. The invention as recited in claim 1 wherein said fusing step includes positioning the tape above a cavity, and disposing a blank of the fusible material in the cavity.

3. The invention as recited in claim 2 wherein said disposing step includes shearing a predetermined amount of strip stock of the fusible material to form the blank.

4. The invention as recited in claim 3 wherein said positioning step includes supporting the slide fastener in a forming block defining the cavity along with the end of a forming anvil, and said shearing step includes moving the forming block relative to the forming anvil to shear the strip stock.

5. The invention as recited in claim 4 wherein said moving step includes moving a fusing member to engage and move the forming block.

6. The invention as recited in claim 5 wherein said fusing step includes providing ultrasonic energy to the fusing member.

7. The invention as recited in claim 6 wherein said deforming step includes placing the terminal ones of the fastener elements in cavities in a forming member and providing ultrasonic energy to the forming member to reduce the size of the terminal ones of the fastener elements.

8. The invention as recited in claim 1 wherein said deforming step includes reducing the size of the terminal ones of the fastener elements relative to the remainder of the fastener elements.

9. The invention as recited in claim 8 wherein said reducing step includes placing the terminal ones of the fastener elements in cavities in a forming member and providing ultrasonic energy to the forming member.

10. A method of forming a top portion for a slide fastener of the type having first and second tapes carrying first and second fastener elements, respectively, each of the first and second fastener elements being made of a continuous filament of deformable material, said method comprising the steps of
supporting said first and second tapes in parallel channels in a support block to expose terminal ones of the first and second fastener elements;
simultaneously reducing the size of the terminal ones of the first and second fastener elements; and
simultaneously fusing first and second masses of fusible material to the first and second tapes adjacent the terminal ones of the first and second fastener elements, respectively, to form separate top stop members for the slide fastener.

11. The invention as recited in claim 10 wherein said fusing step includes positioning said first and second tapes above first and second cavities, respectively, shearing a predetermined amount of strip stock of the fusible material to form first and second blanks and disposing the first and second blanks in the first and second cavities, respectively.

12. The invention as recited in claim 11 wherein said positioning step includes supporting the slide fastener in a forming block defining the first and second cavities along with first and second ends of a forming anvil, and said shearing step includes moving a fusing member to engage the forming block and move the forming block relative to the forming anvil to shear the strip stock.

13. The invention as recited in claim 12 wherein said reducing step includes placing the terminal ones of the first and second fastener elements in cavities in a forming member and providing ultrasonic energy to the forming member, and said fusing step further includes providing ultrasonic energy to the fusing member.

14. The invention as recited in claim 12 wherein said reducing step includes placing the terminal ones of the first and second fastener elements in cavities in a forming member and providing ultrasonic energy to the forming member.

15. Apparatus for deforming terminal fastener elements of a slide fastener comprising support means for the slide fastener including channel means supporting the slide fastener to expose the terminal fastener elements;

forming means including a forming anvil having a bottom surface and side walls extending from said bottom surface and a cavity means disposed in said bottom surface and being smaller than the terminal element means, said forming means being movable within said channel means to capture at least one terminal fastener element in said cavity means; and means for supplying energy to said forming means to cause said at least one terminal fastener element to assume the shape of said cavity means whereby said at least one terminal fastener element is reduced in size relative to the remainder of the fastener elements of the slide fastener to thereby accommodate a diamond of a slide fastener.

16. The invention as recited in claim 15 wherein said cavity means includes a first cavity and a second cavity, said first cavity being smaller than said second cavity.

17. The invention as recited in claim 16 wherein said forming anvil side walls are parallel and extend transversely from said bottom surface with said first and second cavities being disposed in said bottom surface and angularly oriented with said side walls.

18. The invention as recited in claim 17 wherein said first and second cavities are generally V-shaped in cross section.

19. The invention as recited in claim 15 wherein said channel means includes first and second channels disposed in spaced parallel relation in said support means, each of said first and second channels having a narrow slot terminating in a wide mouth to accommodate first and second slide fastener tapes and first and second thickened cord portions carried thereby, respectively.

20. The invention as recited in claim 19 wherein said forming means includes a second forming anvil with said first and second forming anvils depending in spaced parallel relation from a support member to be movable in said mouths of said first and second channels, respectively, and said cavity means includes first and second cavities in said first forming anvil and third and fourth cavities in said second forming anvil.

21. The invention as recited in claim 20 wherein said first cavity is smaller than said second cavity and said third cavity is smaller than said fourth cavity.

22. The invention as recited in claim 21 wherein said first and second forming anvils each have parallel side walls extending transversely from said bottom surface, said first and second cavities disposed in said bottom surface of said first forming anvil being angularly oriented with said side walls, and said third and fourth cavities being disposed in said bottom surface of said second forming anvil and angularly oriented with said side walls.

23. Apparatus for forming top stop means on a slide fastener comprising a forming block including a forming area, a bore communicating with said forming area, slide fastener guide means extending through said forming area, said slide fastener guide means including first and second channels each having a narrow portion adapted to accommodate a slide fastener tape and a recess adapted to accommodate a thickened cord portion on the edge of the tape, and stock guide means terminating in said forming area, said stock guide means including channel means for delivering fusible material stock to said forming area;

a forming anvil disposed in said bore and having an end with a normally withdrawn position on one side of said channel means and an extended position on the other side of said channel means to form cavity means in cooperation with said stock guide means; and means for placing said end of said forming anvil in said extended position to shear the fusible material and fusing the sheared fusible material to the slide fastener.

24. The invention as recited in claim 23 wherein said channel means includes first and second bores through said stock guide means and said cavity means includes first and second cavities communicating with said first and second bores.

25. The invention as recited in claim 24 wherein said first and second bores are aligned with each other and disposed in transverse relation to said slide fastener guide means.

26. Te invention as recited in claim 25 wherein said forming area has a central wall extending therethrough between said first and second cavities, and said placing and fusing means includes a fusing member having a support member with a bottom surface adapted to engage said central wall and first and second legs depending from said support member and adapted to engage the slide fastener tapes at said first and second cavities, respectively, and said fusing member is connected with a source of ultrasonic energy of fusing the fusible material to the slide fastener.

27. The invention as recited in claim 26 wherein said first and second legs of said fusing member each have an arcuate recess on an inner corner thereof aligned with said recesses of said first and second channels, and said forming anvil is bifurcated to form first and second ends each having energy directing projection means thereon.

28. A method of forming a top stop on a slide fastener tape comprising the steps of supporting the slide fastener tape adjacent a cavity;

disposing a blank of fusible material in the cavity; and fusing the blank onto the slide fastener tape.

29. The invention as recited in claim 28 wherein said disposing step includes positioning a strip of the fusible material in the cavity, and shearing the strip to provide the blank.

30. The invention as recited in claim 29 wherein the slide fastener tape is supported in a forming block defining the cavity along with the end of a forming anvil and said shearing step includes moving the forming block relative to the forming anvil.

31. The invention as recited in claim 28 wherein the slide fastener tape has first and second halves, said supporting step includes supporting the first tape half adjacent a first cavity and supporting the second tape half adjacent a second cavity, said disposing step includes disposing a first blank of fusible material in the first cavity and disposing a second blank of fusible materal in the second cavity and said fusing step includes simultaneously fusing the first and second blanks onto the first and second tape halves, respectively, to form first and second separate stop members.

32. The invention as recited in claim 31 wherein the first and second tape halves are supported in a forming block defining the first and second cavities along with first and second ends of a forming anvil, and said disposing step includes positioning a strip of fusible material in each of the first and second cavities and moving the forming block relative to the forming anvil to shear the strips of fusible material to provide the first and second blanks.

* * * * *